US005967937A

United States Patent [19]

Matsuo

[11] Patent Number: 5,967,937

[45] Date of Patent: Oct. 19, 1999

[54] MOTORIZED SHIFT ASSIST CONTROL APPARATUS FOR BICYCLE TRANSMISSION

[75] Inventor: Nobuyuki Matsuo, Shimonoseki, Japan

[73] Assignee: Shimano, Inc., Osaka, Japan

[21] Appl. No.: 08/932,825

[22] Filed: Sep. 18, 1997

[30] Foreign Application Priority Data

Sep. 24, 1996 [JP] Japan .................................... 8-251107

[51] Int. Cl.[6] ........................................................ F16H 3/44

[52] U.S. Cl. ............................................ 475/297; 475/298

[58] Field of Search .................................... 475/296, 297, 475/298, 299, 149

[56] References Cited

U.S. PATENT DOCUMENTS

| | | | |
|---|---|---|---|
| 3,803,947 | 4/1974 | Hillyer | 475/297 X |
| 4,240,533 | 12/1980 | Fukui | 475/297 |
| 4,276,973 | 7/1981 | Fukui | 192/47 |
| 4,651,853 | 3/1987 | Bergles | 475/297 XQ |
| 5,078,664 | 1/1992 | Nagano | 475/297 |
| 5,562,563 | 10/1996 | Shoge | 475/298 |

FOREIGN PATENT DOCUMENTS

| | | | |
|---|---|---|---|
| 57-42792 | 9/1982 | Japan | B62M 11/16 |

*Primary Examiner*—Khoi Q. Ta

*Attorney, Agent, or Firm*—James A. Deland

[57] ABSTRACT

A shift control device for a bicycle transmission having a plurality of transmission paths includes a hub shaft, a driver rotatably mounted around the hub shaft for rotating in first and second directions, wherein the first direction is opposite the second direction, a transmission path selecting member for selecting among the plurality of transmission paths, and a reverse motion mechanism coupled to the driver for converting rotation of the driver in the first direction into motion in the second direction. An operation mechanism operates the transmission path selecting member, wherein the operation mechanism includes a first drive force takeoff component which moves between a first state and a second state. The first drive force takeoff component engages the reverse motion mechanism when the first drive force takeoff component is in the first state for communicating motion of the reverse motion mechanism in the second direction to the transmission path selecting member, and the first drive force takeoff component is disengaged from the reverse motion mechanism when the first drive force takeoff component is in the second state.

20 Claims, 9 Drawing Sheets

FIG. 3

| Operation position of shift sleeve (31) | Shift step | Clutch pawl (16) | First sun gear pawl (21a) | Second sun gear pawl (22a) | Third sun gear pawl (23a) | Fourth sun gear pawl (24a) |
|---|---|---|---|---|---|---|
| 7th speed pos. | 7th | in | – | ○ | – | – |
| 6th speed pos. | 6th | in | ○ | × | – | – |
| 5th speed pos. | 5th | out | – | ○ | ○ | – |
| 4th speed pos. | 4th | in | × | × | – | – |
| 3rd speed pos. | 3rd | out | ○ | × | × | ○ |
| 2nd speed pos. | 2nd | out | × | × | ○ | – |
| 1st speed pos. | 1st | out | × | × | × | ○ |

–: control not needed; ○: locked attitude; ×: unlocked attitude

MOTORIZED SHIFT ASSIST CONTROL APPARATUS FOR BICYCLE TRANSMISSION

BACKGROUND OF THE INVENTION

The present invention is directed to bicycle transmissions and, more particularly, to bicycle transmissions mounted inside a wheel hub.

Conventional bicycle transmissions can be divided into two types: transmissions that utilize a derailed that is engaged with a chain and that aligns the chain with one of a plurality of gears mounted to a crank or rear wheel of the bicycle, and internal transmissions that are installed in the wheel hub. The apparatus disclosed in Japanese Laid-Open Utility Model Application 57-42792 is an example of an internal transmission. An internal transmission basically makes use of a planet gear mechanism to provide a plurality of shift steps.

The structure of an internal transmission will be described briefly at this point. The important parts in an internal transmission are the fixed shaft that is fixed to the fork of the bicycle, the driver that is rotatably supported on this fixed shaft by bearings or the like and that transmits the drive force from the chain via a gear, and a hub shell that transmits the drive force from the driver via a plurality of drive force transmission routes. The rear wheel is supported on this hub shell via spokes or the like. A planet gear mechanism that forms the plurality of drive force transmission routes is located between the driver and the hub shell. The planet gear mechanism has a sun gear that is provided to the fixed shaft and a planet gear that engages with this sun gear. The planet gear is usually an annular member provided with gear teeth on its outer surface, and it is designed such that it rotates while it revolves with respect to the fixed shaft by means of a gear frame rotatably supported by the fixed shaft. A ring gear that engages with the teeth of the planet gear is often provided radially outwardly from the planet gear. The transmission path through the planet gear mechanism is selected by a clutch that is operated by the rider.

When the bicycle is pedaled, the drive force is transmitted to the driver via the chain and the gear engaged with the chain. The drive force from the driver is transmitted to the planet gear via the gear frame, and when the auto-rotation of this planet gear is transmitted to the hub shell that supports the wheel, the rotation of the driver is accelerated as it is transmitted to the hub shell. When the drive force from the driver is transmitted to the planet gear via the ring gear and is transmitted from the planet gear to the hub shell through the gear frame and the like, the rotation from the driver is decelerated as it is transmitted to the hub shell. Because the clutch must change the path of meshing gears within the planet gear mechanism, a relatively large operating force is sometimes required to operate the clutch. This problem is particularly noticeable when the drive load is heavy, such as when the bicycle is being pedaled hard.

SUMMARY OF THE INVENTION

The present invention is directed to an internally mounted bicycle transmission wherein the shift steps may be selected without requiring an excessive operating force. In one embodiment of the present invention, a shift control device for a bicycle transmission having a plurality of transmission paths includes a hub shaft, a driver rotatably mounted around the hub shaft for rotating in first and second directions, wherein the first direction is opposite the second direction, a transmission path selecting member for selecting among the plurality of transmission paths, and a reverse motion mechanism coupled to the driver for converting rotation of the driver in the first direction into motion in the second direction. An operation mechanism operates the transmission path selecting member, wherein the operation mechanism includes a first drive force takeoff component which moves between a first state and a second state. The first drive force takeoff component engages the reverse motion mechanism when the first drive force takeoff component is in the first state for communicating motion of the reverse motion mechanism in the second direction to the transmission path selecting member, and the first drive force takeoff component is disengaged from the reverse motion mechanism when the first drive force takeoff component is in the second state. Whether the first drive force takeoff component is in the first state or the second state depends upon the required operating force of the transmission path selecting member. If the required operating force of the transmission path selecting member is below a set value (which may be indicative of a light operating force), then the first drive force takeoff component will assume the second state. On the other hand, if the required operating force of the transmission path selecting member is above the set value (which may be indicative of a large operating force), then the first drive force takeoff component will assume the first state, and the motion of the reverse motion mechanism will be used to aid the shifting operation.

In a more specific embodiment, the operation mechanism further includes a second drive force takeoff component that moves between a third state and a fourth state. The second drive force takeoff component engages the driver when the second drive force takeoff component is in the third state for communicating motion of the driver in the first direction to the transmission path selecting member, and the second drive force takeoff component is disengaged from the driver when the second drive force takeoff component is in the fourth state. As with the first drive force takeoff component, whether the second drive force takeoff component is in the third state or the fourth state depends upon the required operating force of the transmission path selecting member. If the required operating force of the transmission path selecting member is below a set value (which again may be indicative of a light operating force), then the second drive force takeoff component will assume the fourth state. On the other hand, if the required operating force of the transmission path selecting member is above the set value (which again may be indicative of a large operating force), then the second drive force takeoff component will assume the third state, and the motion of the driver will be used to aid the shifting operation.

BRIEF DESCRIPTION OF THE DRAWINGS

FIG. 3 is a diagram illustrating the relationship between a selected gear and the state of the sun gear pawls in the transmission shown in FIG. 2;

DETAILED DESCRIPTION OF THE EMBODIMENTS

Overview

Figure 1A:
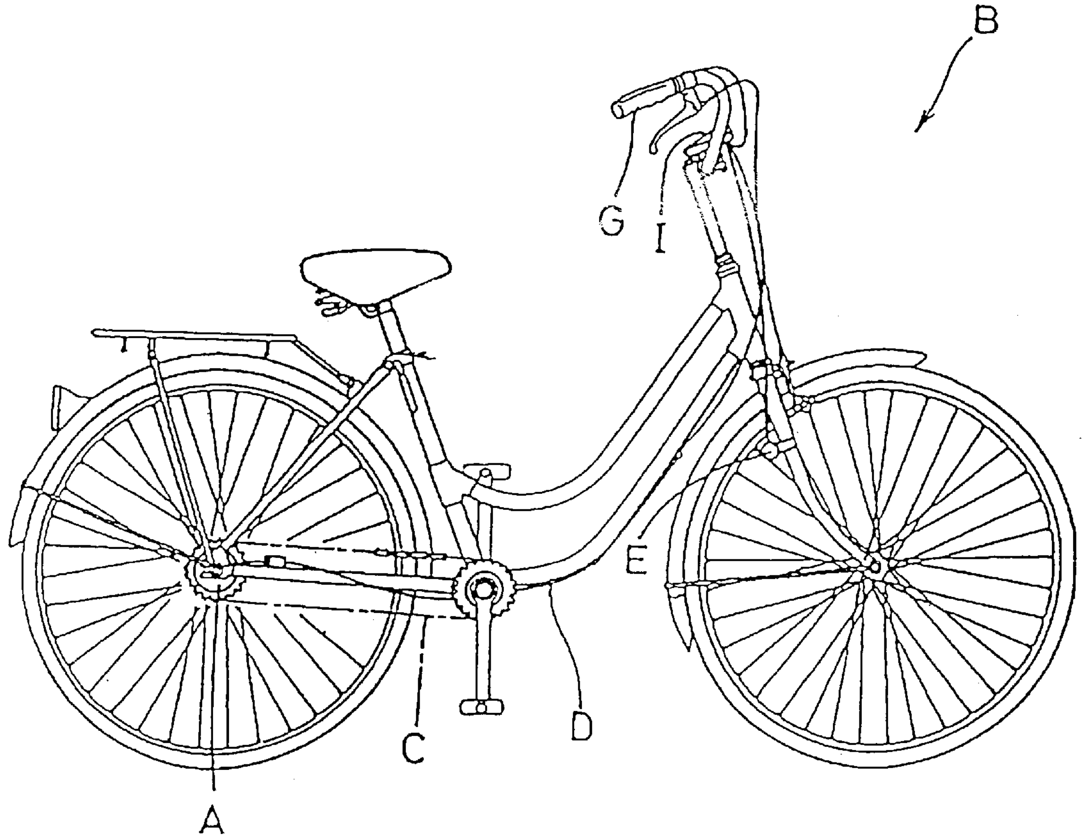
FIG. 1A is a side view of a bicycle that employs a particular embodiment of a shift control apparatus for a bicycle transmission according to the present invention.
Figure 1B:
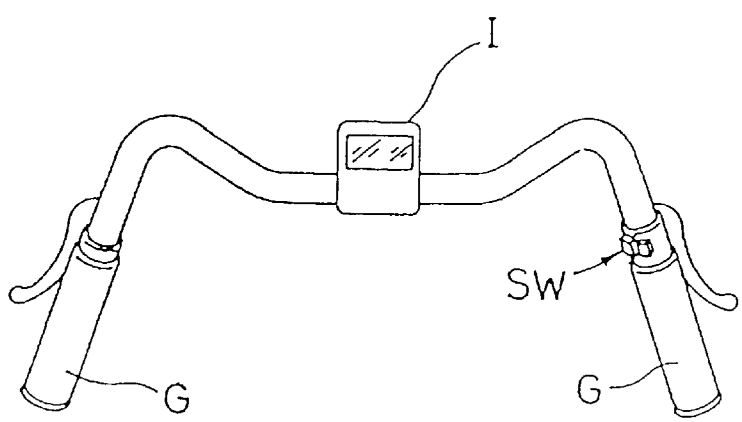
FIG. 1B is a plan view of the handlebar portion of the bicycle shown in FIG. 1 A.

FIG. 1A shows a bicycle B equipped at its rear wheel axle with a particular embodiment of an internal transmission A according to the present invention. Bicycle B further comprises a chain C that transmits the drive force from the pedals to the internal transmission A, a switch SW that is installed near the handle grip G and that selects the shift step, a wire D for transmitting the signals from this switch to the internal transmission A, and a sensor E for monitoring the speed of the bicycle. Switch SW is equipped with two buttons lined up in the peripheral direction of the grip G. A shift up is made when one of these buttons is pressed, and a shift down is made when the other button is pressed. Shifts are usually made one gear at a time with switch SW, but it is also possible to make a multi-gear shift by holding the button down for at least a set period of time, such as one second. As shown in FIG. 1B, an indicator I that is battery-operated and that displays the shift step, the speed, or the like is attached near the stem of the handlebar.

Figure 2:
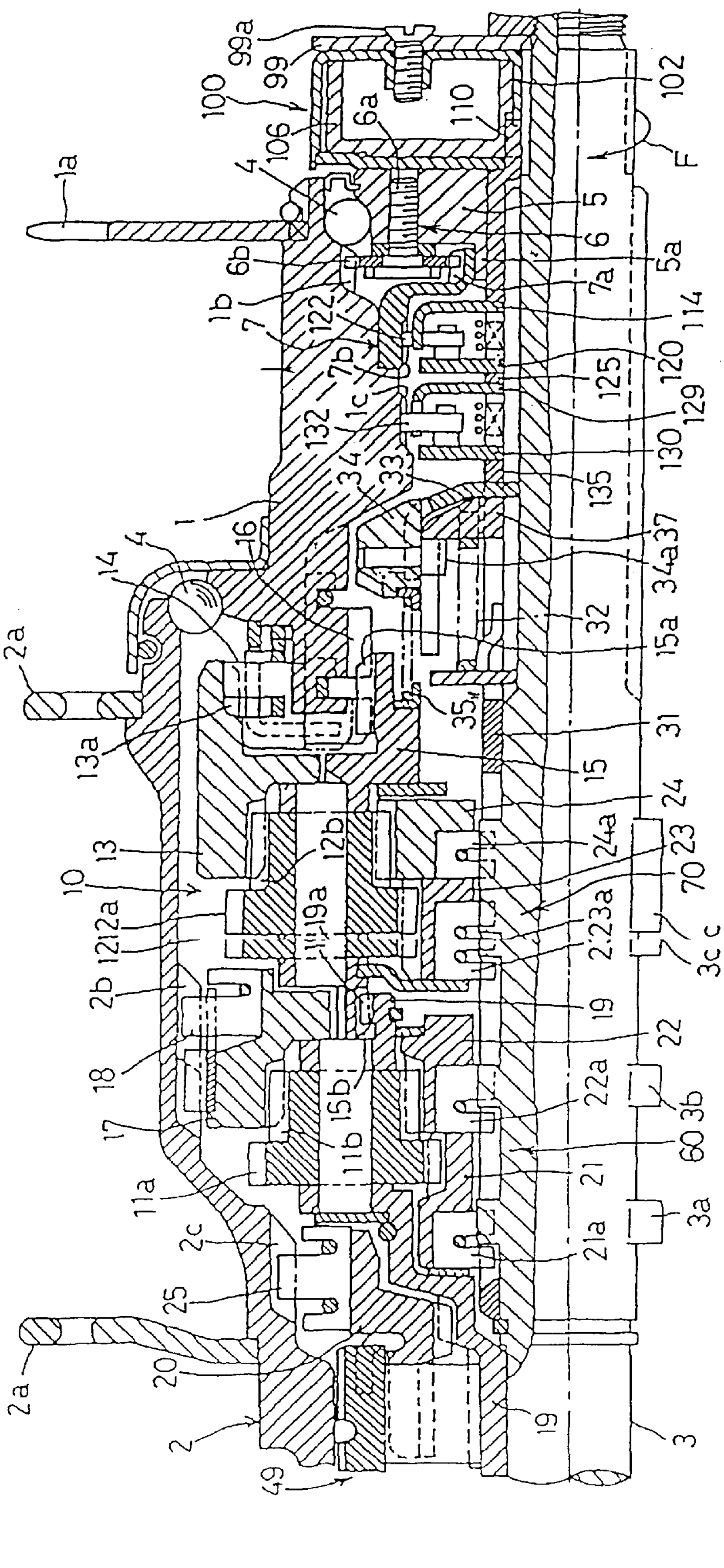
FIG. 2 is a cross sectional view of a particular embodiment of an internally mounted bicycle transmission according to the present invention.

FIG. 2 is a cross sectional view of a particular embodiment of an internally mounted bicycle transmission according to the present invention. In this embodiment, which is directed to a seven-speed bicycle transmission, the transmission comprises a driver 1, which rotationally drives in the drive direction F (hereinafter this direction will also be referred to as clockwise) with a bicycle drive chain wrapped around a gear 1*a*; a hub shell 2 designed such that the spokes (not shown) of the bicycle wheel are linked to a hub flange 2*a*; a fixed shaft 3 that is fixed to the frame of the bicycle; and a planet gear assembly 10 that transmits rotational power from the driver 1 to the hub shell 2. These components are supported by the fixed shaft 3 such that they can rotate via balls 4 and a hub cone 5.

Planet Gear Assembly

The planet gear assembly 10 is equipped with two planet gear mechanisms 60 and 70, and it transmits the rotational force of the driver 1 to the hub shell 2 in seven different shift steps. The first planet gear mechanism 60 is equipped with a first gear frame 19, and a relay 20 provided in the region of a coaster brake 49 is fitted to first gear frame 19 such that it is incapable of rotation relative to first gear frame 19. The first and second sun gears 21 and 22 belonging to the first planet gear mechanism 60 are supported such that they can each rotate independently with respect to the fixed shaft 3 and such that they are incapable of movement in the axial direction. The first and second planet gears 11*a* and 11*b* that mesh with these first and second sun gears 21 and 22, respectively, are formed integrally as a double gear of different diameters, and they are supported by the first gear frame 19. The second planet gear 11*b* meshes with a first ring gear 17.

The second planet gear mechanism 70 is equipped with a second gear frame 15 that is splined-engaged with first gear frame 19 such that it is incapable of rotation relative to first gear frame 19. Third and fourth sun gears 23 and 24 that belong to this second planet gear mechanism 70 are supported such that they can each rotate independently with respect to the fixed shaft 3 and such that they are incapable of movement in the axial direction. The third and fourth planet gears 12*a* and 12*b* that mesh with these third and fourth sun gears 23 and 24, respectively, are formed integrally as a double gear of different diameters, and they are supported by the second gear frame 15. The fourth planet gear 12*b* meshes with a second ring gear 13.

The first ring gear 17 and the relay 20 are used selectively as the output members of the planet gear mechanism 10 to the hub shell 2, and the second ring gear 13 and the second gear frame 15 are selectively interchanged as the input members from the driver 1. A one-way clutch is employed in order to achieve selective power transmission between these members. More specifically, a first transmission clutch 25, which is provided between the relay 20 and the hub shell 2, and a second transmission clutch 18, which is provided between the first ring gear 17 and the hub shell 2, are installed as output one-way clutches, and a third transmission clutch 16, which is provided between the second gear frame 15 and the driver 1, and a fourth transmission clutch 14, which is provided between the second ring gear 13 and the driver 1, are installed as input one-way clutches. These one-way clutches are each formed as a ratchet pawl that engages with ratchet teeth.

The first through fourth transmission pawls 25, 18, 16, and 14 that function as clutches are constantly biased by springs so that they engage with respectively corresponding transmission teeth 2*c*, 2*b*, 15*a*, and 13*a*. The first transmission pawl 25 is attached to the relay 20, the second transmission pawl 18 is attached to the first ring gear 17, and the third and fourth transmission pawls 16 and 14 are attached to the driver 1. The transmission pawls 25,18,16, and 14 are arranged such that the hub shell 2, the second gear frame 15, or the second ring gear 13 follows the respective pawl only when the members to which the pawls are attached rotate in the drive direction F, which is indicated by an arrow in FIG. 2.

The fourth transmission pawl 14 is biased by a pawl spring (not shown) to an erect position, and it transmits the rotational force of the driver 1 to the ring gear 13. Fourth transmission pawl 14 also permits the ring gear 13 to rotate ahead of the driver 1. The second transmission pawl 18 is biased by a pawl spring (not shown) to an erect position, and it transmits the rotational force of the ring gear 17 to the hub shell 2. The first transmission pawl 25 is biased by a pawl spring (not shown) to an erect position, and it allows the hub shell 2 to rotate at a higher speed than the relay 20. First transmission pawl 25 also transmits to the hub shell 2 the rotational force transmitted from the gear frame 19 of the first planet gear 11 to the relay 20, and it permits the hub shell 2 to rotate ahead of the relay 20.

The third transmission pawl 16 is biased by a pawl spring (not shown) to an erect position. Third transmission pawl 16 transmits the rotational force of the driver 1 to the gear frame 15 when third transmission pawl 16 is in its erect state, and it cuts off transmission from the driver 1 to the gear frame 15 when its in a disengaged state. The first gear frame 19 and the second gear frame 15 are meshed and linked so that they rotate integrally by teeth 15*b* and 19*a* provided to these respective frames. The third transmission pawl 16 meshes over the entire width of the third transmission teeth 15*a*, and the third transmission pawl 16 can be moved in and out by a transmission pawl operator 34 (discussed below).

As shown in FIGS. 2 and 6A through 6D, first through fourth sun gear pawls 21*a*, 22*a*, 23*a*, and 24*a* are located between the first through fourth sun gears 21, 22, 23, and 24, and the pawls are attached swingably to the inner periphery of the first through fourth sun gears such that they function as one-way clutches. These sun gear pawls are constantly biased toward the fixed shaft 3. A first restricting protrusion 3*a* that can be engaged with the first sun gear pawl 21*a*, a second restricting protrusion 3*b* that can be engaged with the second sun gear pawl 22*a*, and a third restricting protrusion 3*c* that can be engaged with both the third and fourth sun gear pawls 23*a* and 24*a* are formed on the fixed shaft 3. The joint action of these sun gear pawls and restricting protrusions prohibits the rotation of the respective sun gears in one direction about the fixed shaft 3. Here, the first and second sun gear pawls 21*a* and 22*a* are disposed so as to permit rotation in the opposite direction from the drive direction F with respect to the fixed shaft 3, whereas the third and fourth sun clutches 23 and 24 are disposed so as to permit rotation in the drive direction F with respect to the fixed shaft 3. Because the first sun gear 21 has a small diameter, the boss thereof is extended to the left, and the first sun gear pawl 21*a* is provided to this extended portion. The freewheeling/fixed control of the sun gears 21, 22, 23, and 24 with respect to the fixed shaft 3 is performed selectively by a shift sleeve 31, which is described in detail below.

The seven shift steps in this internal transmission are achieved as follows.

As shown in FIG. 3, the transmission is in the seventh speed when the third transmission pawl 16 is engaged, the first sun gear pawl 21*a* does not need control, the second sun gear pawl 22*a* is in a locked attitude, the third sun gear pawl 23*a* does not need control, and the fourth sun gear pawl 24*a* does not need control. In this state, the rotational force of the driver 1 is transmitted to the hub shell 2 via the third transmission pawl 16, the gear frames 15 and 19, the first planet gear 11, the ring gear 17, and the second transmission pawl 18.

The transmission is in the sixth speed when the third transmission pawl 16 is engaged, 15 the first sun gear pawl 21*a* is in a locked attitude, the second sun gear pawl 22*a* is in an unlocked attitude, the third sun gear pawl 23*a* does not need control, and the fourth sun gear pawl 24*a* does not need control. In this state, the rotational force of the driver 1 is transmitted to the hub shell 2 via the third transmission pawl 16, the gear frames 15 and 19, the first planet gear 11, the ring gear 17, and the second transmission pawl 18.

The transmission is in the fifth speed when the third transmission pawl 16 is disengaged, the first sun gear pawl 21*a* does not need control, the second sun gear pawl 22*a* is in a locked attitude, the third sun gear pawl 23*a* is in a locked attitude, and the fourth sun gear pawl 24*a* does not need control. In this state, the rotational force of the driver 1 is transmitted to the hub shell 2 via the fourth transmission pawl 14, the ring gear 13, the second planet gear 12, the gear frames 15 and 19, the first planet gear 11, the ring gear 17, and the second transmission pawl 18.

The transmission is in the fourth speed when the third transmission pawl 16 is engaged, the first sun gear pawl 21*a* is in an unlocked attitude, the second sun gear pawl 22*a* is in an unlocked attitude, the third sun gear pawl 23*a* does not need control, and the fourth sun gear pawl 24*a* does not need control. In this state, the rotational force of the driver 1 is transmitted to the hub shell 2 via the third transmission pawl 16, the gear frames 15 and 19, the rotational power transmitter 20, and the first transmission pawl 25.

The transmission is in the third speed when the third transmission pawl 16 is disengaged, the first sun gear pawl 21*a* is in a locked attitude, the second sun gear pawl 22*a* is in an unlocked attitude, the third sun gear pawl 23*a* is in an unlocked attitude, and the fourth sun gear pawl 24*a* is in a locked attitude. In this state, the rotational force of the driver 1 is transmitted to the hub shell 2 via the fourth transmission pawl 14, the ring gear 13, the second planet gear 12, the gear frames 15 and 19, the first planet gear 11, the ring gear 17, and the second transmission pawl 18.

The transmission is in the second speed when the third transmission pawl 16 is disengaged, the first sun gear pawl 21*a* is in an unlocked attitude, the second sun gear pawl 22*a* is in an unlocked attitude, the third sun gear pawl 23*a* is in a locked attitude, and the fourth sun gear pawl 24*a* does not need control. In this state, the rotational force of the driver 1 is transmitted to the hub shell 2 via the fourth transmission pawl 14, the ring gear 13, the second planet gear 12, the gear frames 15 and 19, the rotational power transmitter 20, and the first transmission pawl 25.

The transmission is in the first speed when the third transmission pawl 16 is disengaged, the first sun gear pawl 21*a* is in an unlocked attitude, the second sun gear pawl 22*a* is in an unlocked attitude, the third sun gear pawl 23*a* is in an unlocked attitude, and the fourth sun gear pawl 24*a* is in a locked attitude. In this state, the rotational force of the driver 1 is transmitted to the hub shell 2 via the fourth transmission pawl 14, the ring gear 13, the second planet gear 12, the gear frames 15 and 19, the relay 20, and the first transmission pawl 25.

Shift Sleeve/Transmission Pawl Operating Mechanism

The internal transmission shown in FIG. 2 includes a shift sleeve 31, which is fitted to the fixed shaft 3 such that it is capable of forward and backward rotation, a return spring 32 that rotationally energizes the shift sleeve 31 in the backward rotation direction on the inner side of the hub from the hub cone 5, a transmission pawl operator 34 that is supported by the fixed shaft 3 via a support member 33 near the hub cone 5, a return spring 35 that acts on this transmission pawl operator 34, and so on.

Figure 4A:
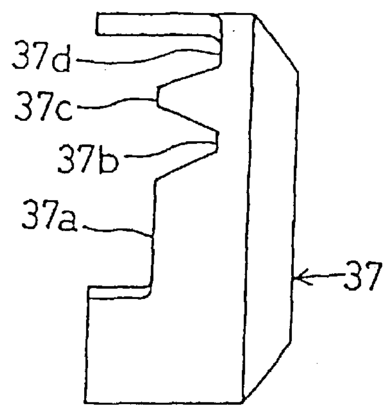
FIG. 4A is a side view of a particular embodiment of a cam body used in the transmission shown in FIG. 2.
Figure 4B:
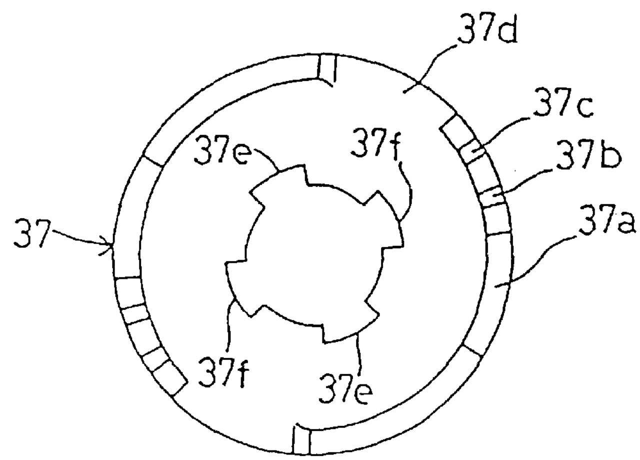
FIG. 4B is a front view of the cam body shown in FIG. 4A.

The shift sleeve 31 rotates clockwise and counterclockwise about the axis of the fixed shaft 3. Shift sleeve 31 is switched between seven operating positions, from the first speed position at one rotational stroke end to the seventh speed position at the other rotational stroke end. As shown in FIG. 4B, a pair of depressions 37*e*, which receive a pair of protrusions from the shift sleeve 31, are provided to a cam body 37, with the fitting being such that integral rotation with the shift sleeve 31 is possible.

When the shift sleeve 31 is at the first through third speed positions, the first striking component 37*a* of the cam body 37 strikes the operating pin 34*a* of the transmission pawl operator 34. When this happens, the first striking component 37*a* slides the transmission pawl operator 34 toward the third transmission pawl 16 along the guide of the support member 33 against the return spring 35, and the cam component of the transmission pawl operator 34 strikes the end of the third transmission pawl 16 and lowers the third transmission pawl 16 to the driver side. As a result, the shift sleeve 31 disengages the third transmission pawl 16.

When the shift sleeve 31 is in the fourth speed position, a second striking component 37*b*, which is the bottom of a notch in the cam body 37, lines up with the operating pin 34*a* of the transmission pawl operator 34. When this happens, the transmission pawl operator 34 slides away from the third transmission pawl 16 because of the operating force produced by the elastic recovery force of the return spring 35, and the third transmission pawl 16 is engaged by the biasing force of the pawl spring. As a result, the shift sleeve 31 engages the third transmission pawl 16.

When the shift sleeve 31 is in the fifth speed position, the third striking component 37*c* of the cam body 37 strikes the operating pin 34*a* and slides the transmission pawl operator 34 toward the third transmission pawl 16 against the return spring 35, and the cam component of the transmission pawl operator 34 strikes the end of the third transmission pawl 16 and lowers the third transmission pawl 16 to the driver side. As a result, the shift sleeve 31 disengages the third transmission pawl 16.

When the shift sleeve 31 is in the sixth and seventh speed positions, a fourth striking component 37*d*, which is the bottom of a notch in the cam body 37, lines up with the operating pin 34*a*, the transmission pawl operator 34 slides away from the third transmission pawl 16 because of the return spring 35, and the third transmission pawl 16 is engaged by the biasing force of the pawl spring. As a result, the shift sleeve 31 engages the third transmission pawl 16.

Figure 5:
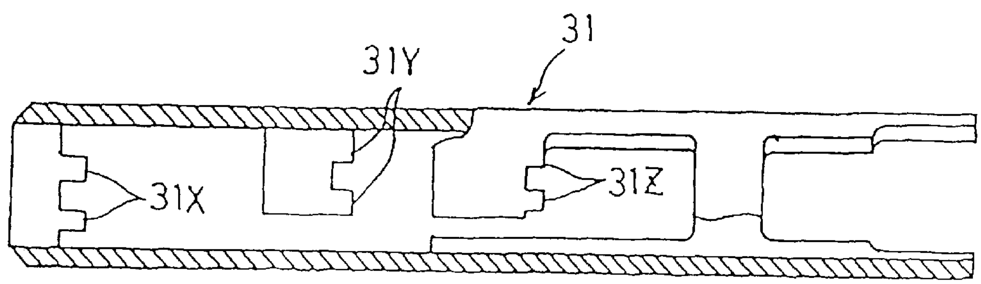
FIG. 5 is a partial cross sectional view of a particular embodiment of a shift sleeve used in the transmission shown in FIG. 2.
Figures 6A, 6B, 6C, 6D:
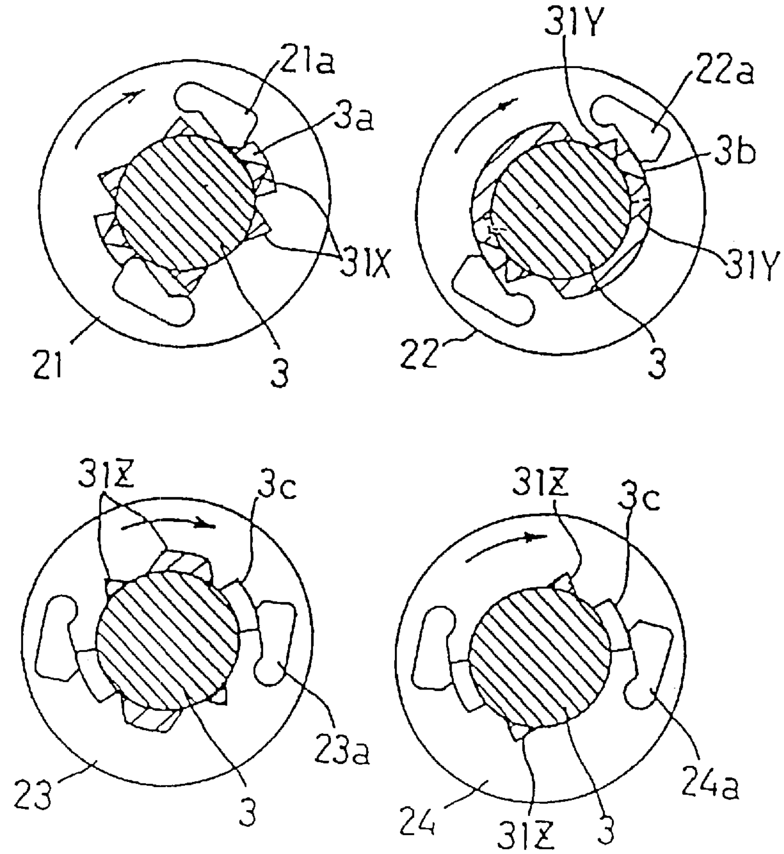
FIG. 6A–6D are cross sectional views illustrating the engagement of the various sun gear pawls with their associated sun gears when the bicycle transmission is set in the sixth speed position.

As shown in FIG. 5, the shift sleeve 31 is equipped with a first control component 31X, a second control component 31Y, and a third control component 31Z at places corresponding to the sun gears 21 through 22. As the shift sleeve 31 rotates, the first control component 31X moves about the fixed shaft axis with respect to the first protrusion 3*a* of the fixed shaft 3, which makes it possible for the first sun gear pawl 21*a* to stop at the first protrusion 3*a*, or makes it possible for the first sun gear pawl 21*a* to ride up and over the first protrusion 3*a* using the first control component 31X as a guide. Additionally, as the shift sleeve 31 rotates, the second control component 31Y moves about the fixed shaft axis with respect to the second protrusion 3*b* of the fixed shaft 3, which makes it possible for the second sun gear pawl 22*a* to stop at the second protrusion 3*b*, or makes it possible for the second sun gear pawl 22*a* to ride up and over the second protrusion 3*b* using the second control component 31Y as a guide. Finally, as the shift sleeve 31 rotates, the third control component 31Z moves about the fixed shaft axis with respect to the third protrusion 3*c* of the fixed shaft 3, which makes it possible for the third sun gear pawl 23*a* to stop at the third protrusion 3*c*, or makes it possible for the third sun gear pawl 23*a* to ride up and over the third protrusion 3*c* using the third control component 31Z as a guide.

When the shift sleeve 31 is in each of the first through seventh speed positions, the sun gear pawls 21*a* through 24*a* are operated by the control components 31X, 31Y, and 31Z so that they do not need control, are in a locked attitude, or are in an unlocked attitude, as shown in FIG. 3. For example, the relationship between the control components of the shift sleeve 31 and the four sun gear pawls when the shift sleeve 31 is in the sixth speed position is shown in FIGS. 6A, 6B, 6C, and 6D, respectively. As is clear from these figures, part of the first control component 31X lines up with the first protrusion 3*a*, the other part of the first control component 31X is away from the first protrusion 3*a*, the first sun gear pawl 21*a* stops at the first protrusion 3*a*, part of the second control component 31Y is located near the second protrusion 3*b*, and the second sun gear pawl 22*a* rides up and over the second protrusion 3*b* using the second control component 31Y as a riding guide. The third and fourth sun gear pawls 23*a* and 24*a* do not need to be controlled since their rotational direction is the freewheeling direction.

Reverse Motion Mechanism

The internal transmission pertaining to the present invention is equipped with a reverse motion mechanism that moves in the opposite rotational direction from the driver 1. As described below, this reverse motion mechanism is made up of a pinion gear 6 and a reverse motion unit 7.

As shown in FIG. 2, the pinion gear 6 is rotatably supported by the hub cone 5, which is fixed to the fixed shaft 3. This pinion gear 6 has a shaft component 6*a* that extends parallel to the fixed shaft 3, and gear teeth 6*b* that rotate integrally with the shaft component 6*a*. These gear teeth 6*b* engage with the gear 1*b* provided to the inner surface on the right end of the driver 1, which results in the displacement of the upper portion of the pinion gear 6 in the same direction as the driver 1. The gear teeth 6*b* located on lower portion of pinion gear 6 are engaged with the reverse motion unit 7.

Reverse motion unit 7 has a tubular small diameter component and large diameter component. A gear 7*a* that engages with the gear teeth 6*b* of the pinion gear 6 is provided on the outer peripheral surface of the small diameter component, and a gear 7*b* that engages with a first drive force takeoff component 120 (described in detail below) is provided on the inner peripheral surface of the large diameter component. A surface that extends perpendicular to the fixed shaft 3 links the small diameter component and large diameter component. Reverse motion unit 7 is rotatably supported by a cylindrical extension 5*a* that extends in the axial direction and is provided to the outer peripheral surface of the hub cone 5. Because reverse motion unit meshes with the gear teeth 6*b* located on the lower portion of pinion gear 6, reverse motion unit 7 rotates in the opposite direction from driver 1.

Operation Mechanism

As discussed above, the transmission disclosed in this embodiment is designed such that all shift steps are obtained by the rotation of the cam body 37 and the shift sleeve 31.

This combination of the cam body 37 and the shift sleeve 31 is called a clutch in this embodiment. The present invention provides a transmission with extremely light operation even when the drive load is heavy, which is accomplished by operating this clutch by an operation mechanism that includes a DC motor 101. The operation mechanism, which is linked to the clutch and operates the clutch by rotating it in the drive direction or in the back-pedaling direction, will now be described through reference to FIGS. 2 and 7 through 9.

Motor

First, the motor component 100 will be described. The signal from the switch SW provided near the handle grips is processed by a controller (not shown) that is provided near the motor component 100 and that is electrically linked via the cord D in FIG. 1. The signal from the switch SW corresponds to an up-shift or down-shift. However, if a signal comes in from the switch SW, the controller does not instantly transmit it to the motor 101. Instead, the controller first confirms whether the command signal from the switch SW exceeds the highest speed position or is under the lowest speed position. Therefore, when an up-shift signal is sent from the switch SW despite the fact that the transmission is in the highest speed position, the motor 101 is not driven. This controller drives the motor 101 such that a one-speed shift is made if the switch SW is held down for a specific length of time or less, and a shift corresponding to a plurality of speeds is made if the switch SW is held down longer than the set time.

The motor 101 is fixed as a whole to the interior of a cylindrical motor case 102. This motor case 102 is itself non-rotatably fixed to the fixed shaft by a fixing plate 99 and a bolt 99*a*. The rotating shaft of the motor 101 faces in the direction perpendicular to the fixed shaft 3, and a brass worm gear 101*a* is attached to the distal end of this rotating shaft. This worm gear 101*a* meshes with the large diameter gear 103*a* of a first gear 103 that rotates about a shaft 102*a* that extends parallel to the fixed shaft 3. Rotating shaft 102*a* is integrally formed such that it extends from one side surface of the motor case 102 toward the other side surface.

Figure 9B:
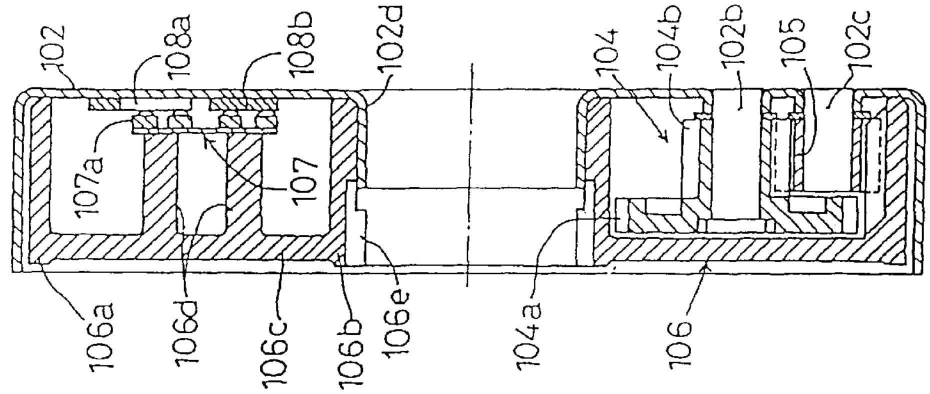
FIGS. 9A and 9B are front and side cross sectional views, respectively, of a motor drive apparatus used to control the bicycle transmission shown in FIG. 2.

The first gear 103 is equipped with a small diameter gear 103*b* that is formed integrally with the large diameter gear 103*a*. This small diameter gear 103*b* is engaged with the large diameter gear 104*a* of a second gear 104, wherein the second gear 104 rotates about a shaft 102*b* provided to the motor case 102 parallel to the fixed shaft 3. This second gear 104 has a small diameter gear 104*b* that is formed integrally with the large diameter gear 104*a*, and this small diameter gear 104*b* is engaged with a third gear 105. The third gear 105 meshes with a gear provided to the inner surface of the outer tube 106*a* of a fourth gear 106. As shown in FIG. 9B, the fourth gear 106 has an inner tube 106*b* that rotates about the fixed shaft 3 and extends parallel to the fixed shaft 3 and an outer tube 106*a* that is concentric with the inner tube 106*b*. These two tubes are integrally linked by a surface 106*c* that extends perpendicular to the fixed shaft 3. The motor case 102 is equipped with a tube 102*d* that goes between the fixed shaft 3 and the inner tube 106*b* of the fourth gear 106.

As shown in FIG. 9B, the first gear 103, second gear 104, and third gear 105 are disposed in the space formed between the outer tube 106*a* and the inner tube 106*b* of the fourth gear 106. The rotational force from the third gear 105 is transmitted via the outer tube 106*a* to the right sleeve 110 shown in FIG. 7, which is linked to the inner tube 106*b*. The rotational speed of the motor 101 is reduced by this plurality of gears, and the reduction ratio should be small enough that a large operating force can be obtained even with a small motor. 1/500 is preferable, and 1/700 is even better if possible.

The motor component 100 is equipped with a shift step sensor having a potentiometer. This potentiometer is linked to the controller and has a first resistor 108*a*, a second resistor 108*b*, and a terminal component 107 comprising four contact terminals 107*a* that electrically connect the first resistor 108*a* and second resistor 108*b*. As shown in FIG. 9B, this terminal component 107 is supported on the fourth gear 106 by a support 106*d* that extends in the axial direction. The first resistor 108*a* and second resistor 108*b* are fixed to the inner surface of the motor case 102.

Figure 9A:
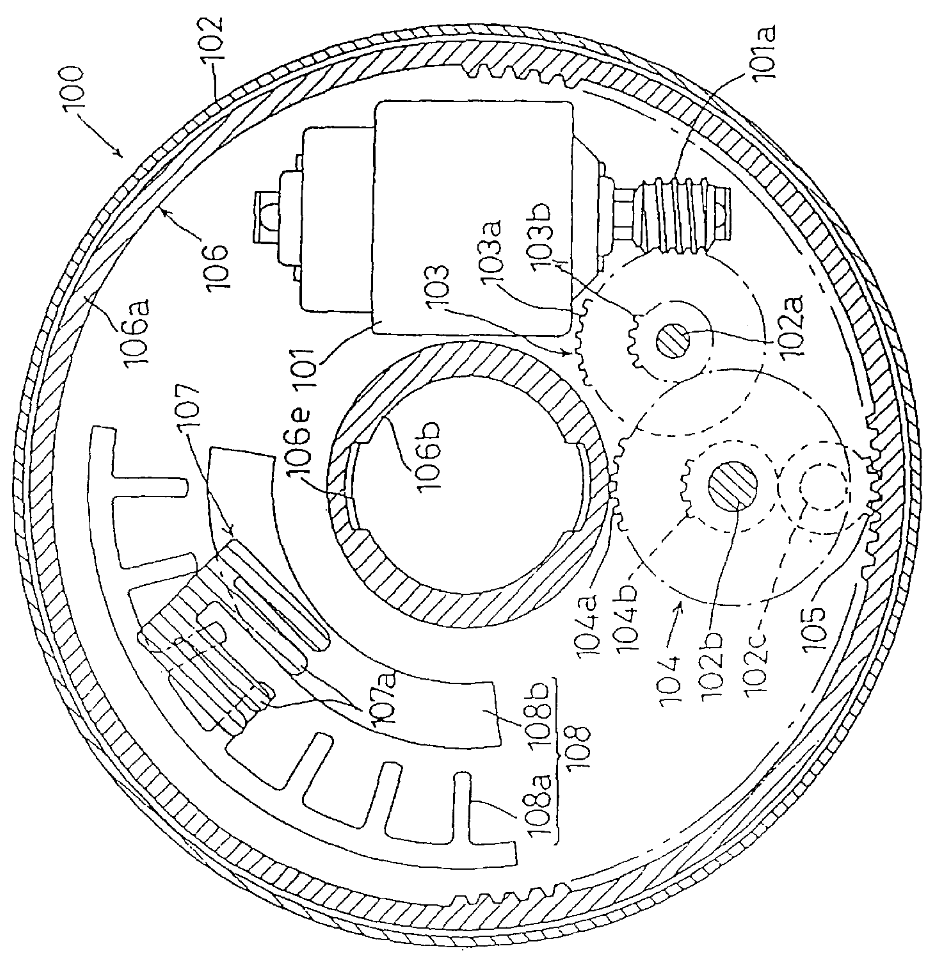

As shown in FIG. 9A, the first resistor 108*a* is composed of a base that defines a partial arc and a plurality of extensions that extend inward in the radial direction from the base. The plurality of extensions are provided at specific intervals, and correspond to the plurality of speed positions. Therefore, when the fourth gear 106 is rotated by the motor 101, the terminal component 107 moves along with it, and two of the four contact terminals 107*a* come into contact with one of the plurality of extensions. The other two of the contact terminals 107*a* are always in contact with the second resistor. Therefore, if the first and second resistors are connected to one of the poles of a cell, and the terminal component 107 is connected to the other pole, then the resistance will vary depending on whether the terminal component 107 and the first resistor 108*a* are in contact, which is determined by the relative position of the terminal component 107 with respect to the two resistors. This change in the resistance of the potentiometer is sensed by the controller, and the controller detects when the next shift position is reached, and which of the plurality of shift positions has been reached.

Drive Force Takeoff Components

Figure 7:
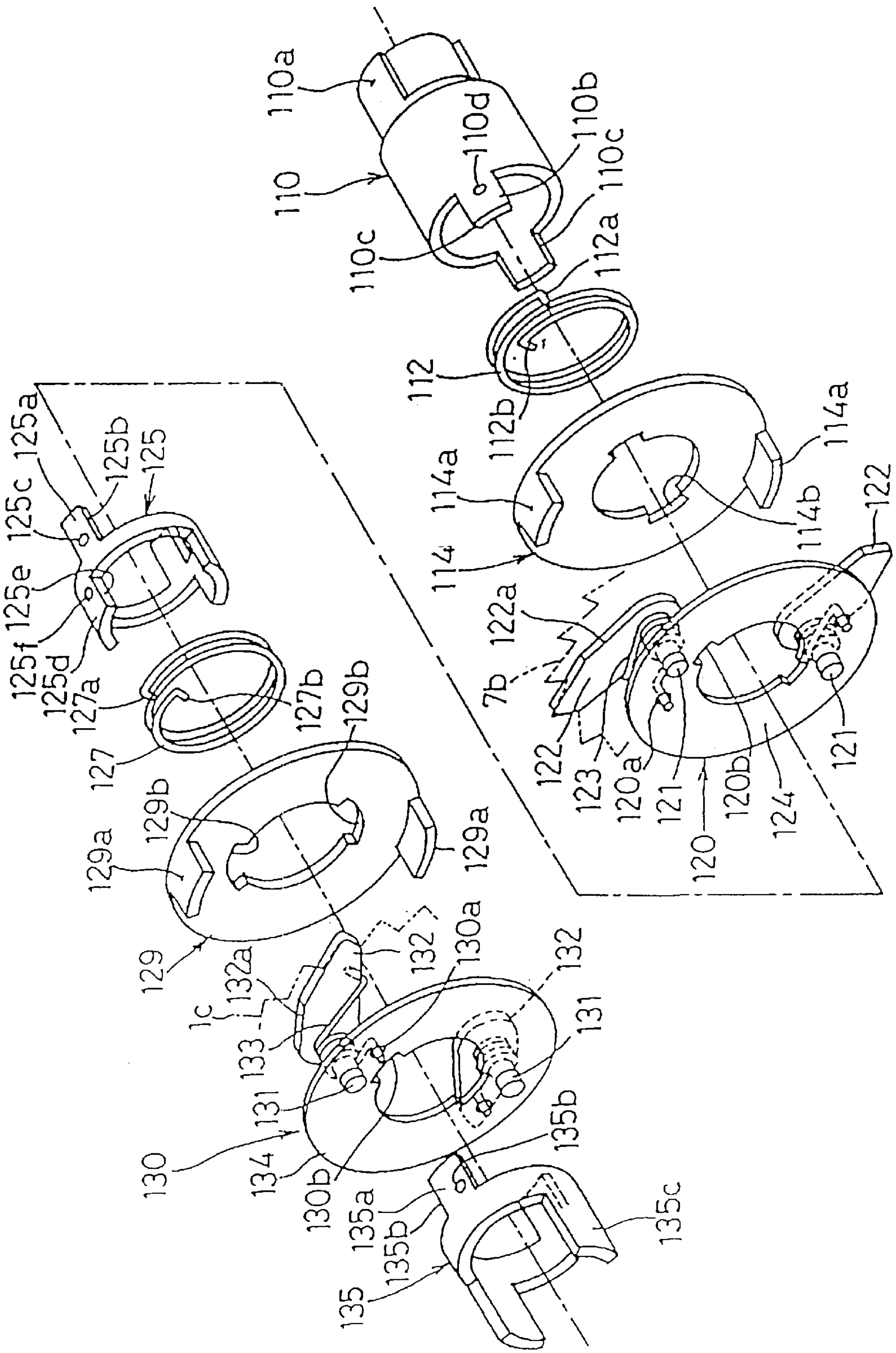
FIG. 7 is an exploded view of a particular embodiment of a drive force takeoff mechanism used in the transmission shown in FIG. 2.

Next, FIG. 7 will be used to describe the drive force takeoff components that take off drive force from the driver 1 when a large operating force is needed to operate the clutch. This drive force takeoff component makes up part of the operation mechanism, and it is interposed between the clutch and the motor component 100.

First, a transmission path control member in the form of a right sleeve 110 is engaged such that it rotates integrally with respect to the inner tube 106*b* of the fourth gear 106 in the motor component 100. This engagement is accomplished by the engagement of a pair of engagement protrusions 110*a* that extend in the axial direction from the right sleeve 110 with a pair of depressions 106*e* provided on the inside diameter side of the inner tube 106*c* shown in FIG. 9. This engagement may be accomplished by any method, such as using a drag clutch, as long as the engagement allows integral rotation. The right sleeve 110 has an overall tubular shape, and it is able to rotate about the fixed shaft 3. Right sleeve 110 also is provided with engagement protrusions 110*b* that engage with the first control component 114 on the opposite side in the axial direction from the engagement protrusions 110*a*. The lateral surfaces in the peripheral direction of these engagement protrusions 110*b* form striking surfaces 110*c* that strike the striking surfaces 125*b* formed on the lateral surfaces in the peripheral direction of the engagement protrusions 125*a* of a middle sleeve 125.

The first control component 114 has an annular body that extends perpendicular to the fixed shaft 3 and a pair of pawl depressors 114*a* that extend in the axial direction of the fixed shaft 3 from the periphery of the body. Engagement grooves 114*b* that go all the way through and in which the engagement protrusions 110*b* of the right sleeve 110 engage are provided to the inner side of the annular body of the first control component 114. Thus, the first control component 114, the right sleeve 110, and the fourth gear 106 of the motor component 100 are designed so as to rotate integrally.

The part drawn to the left of the first control component 114 in FIG. 7 is the first drive force takeoff component 120. This first drive force takeoff component 120 is equipped with a main disk 124 that is provided in its center with a hole through which the fixed shaft 3 passes, and that is supported such that it can rotate freely with respect to the fixed shaft 3.

A first engagement pawl 122 that is used to engage with the reverse motion unit 7 is supported at its end by a pawl support shaft 121 such that it can swing on the disk 124. This engagement pawl 122 is biased radially outwardly by a first biasing mechanism in the form of spring 123, that is, in the direction of engagement with the reverse motion unit 7. One end of the biasing spring 123 engages with the engagement pawl 122, and the other end is engaged with a hole 120*a* provided to the disk 124. The surface located on the outside in the radial direction of the engagement pawl 122 is formed as a sliding surface 122*a* shaped such that it extends at an angle in the radial direction in a first state in which the engagement pawl 122 is engaged with the reverse motion unit 7. When the pawl depressor 114*a* of the first control component 114 strikes this sliding surface 122*a* from the outside in the radial direction, the engagement pawl 122 is disengaged from the reverse motion unit 7, resulting in a second, non-transmission state.

Engagement grooves **120*b* that engage with the engagement protrusions 125*a* extending in the axial direction from the middle sleeve 125 are formed in the inner peripheral surface of the disk 124 of the first drive force takeoff component 120. As a result of this engagement, the first drive force takeoff component 120 and the middle sleeve 125** rotate integrally.

The middle sleeve 125 has an overall tubular shape, and it is able to rotate about the fixed shaft 3. Middle sleeve 125 is provided with engagement protrusions **125*d* that engage with a second control component 129 on the opposite side in the axial direction from the engagement protrusions 125*a*. The lateral surfaces in the peripheral direction of these engagement protrusions 125*d* form striking surfaces 125*e* that strike the striking surfaces 135*b* formed on the lateral surfaces in the peripheral direction of the engagement protrusions 135*a* of a transmission path selecting member in the form of a left sleeve 135**.

The second control component 129 is formed in the same manner as the first control component 114. Second control component 129 has an annular body that extends perpendicular to the fixed shaft 3 and a pair of pawl depressors **129*a* that extend in the axial direction of the fixed shaft 3 from the periphery of the body. Engagement grooves 129*b* that go all the way through and in which the engagement protrusions 125*d* of the middle sleeve 125 engage are provided to the inner peripheral surface of the annular body of the second control component 129. Thus, the first drive force takeoff component 120, the middle sleeve 125, and the second control component 129** are designed so as to rotate integrally.

Figure 8:
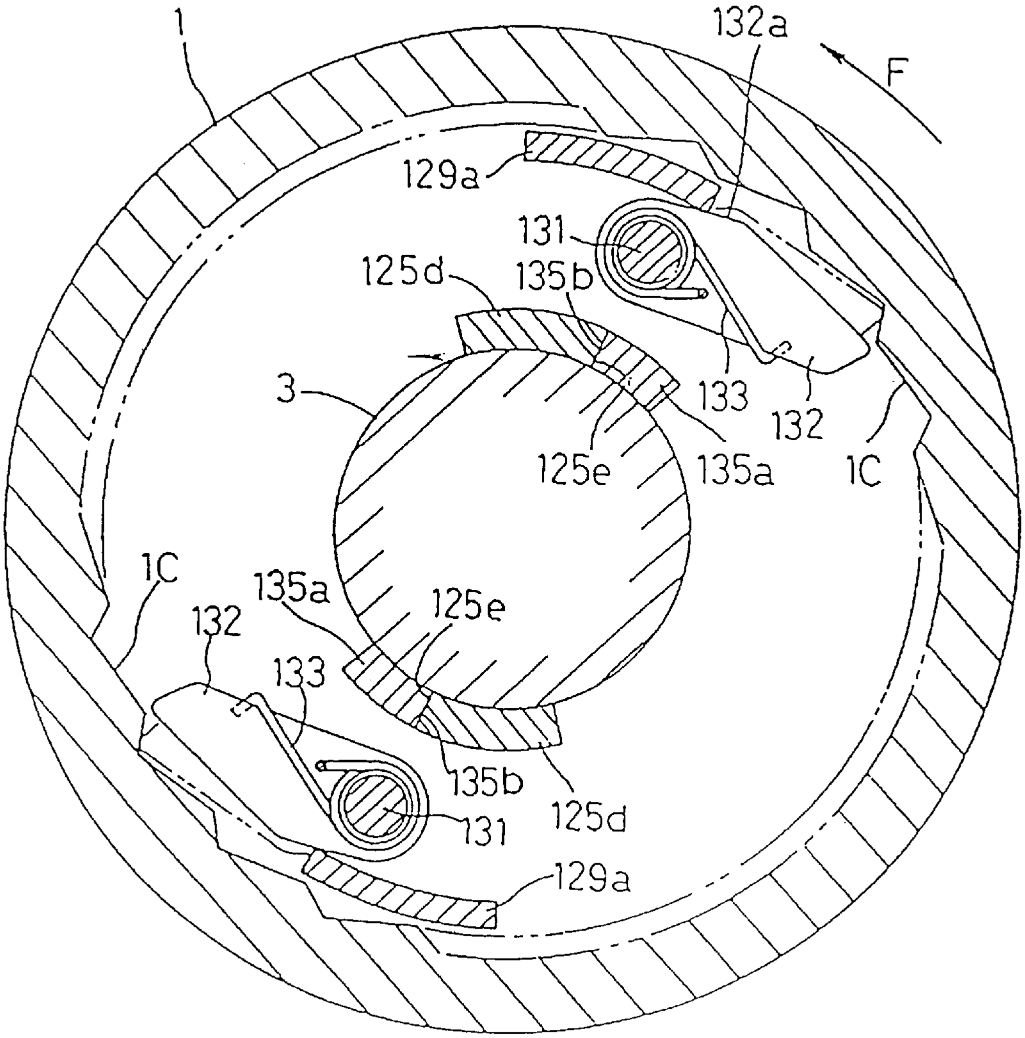
FIG. 8 is a cross sectional view illustrating the operation of one of the drive force takeoff components shown in FIG. 7.

The part drawn to the left of the second control component 129 in FIG. 7 is the second drive force takeoff component 130. This second drive force takeoff component 130 is equipped with a main disk 134 that is provided in its center with a hole through which the fixed shaft 3 passes, and that is supported such that it can rotate freely with respect to the fixed shaft 3. A second engagement pawl 132 that is used to engage with the gear **1*c* provided to the inner peripheral surface of the driver 1 is supported at its end by a pawl support shaft 131 such that it can swing on the disk 134. This engagement pawl 132 is biased radially outwardly by a second biasing mechanism in the form of a spring 133, that is, in the direction of engagement with the driver 1. One end of the biasing spring 133 engages with the engagement pawl 132, and the other end is engaged with a hole 130*a* provided to the disk 134. The surface located on the outside in the radial direction of the engagement pawl 132 is formed as a sliding surface 132*a* shaped such that it extends at an angle in the radial direction in a third state in which the engagement pawl 132 is engaged with the driver 1. As shown in FIG. 8, when the pawl depressor 129*a* of the second control component 129 strikes this sliding surface 132*a* from the outside in the radial direction, the engagement pawl 132 is disengaged from the driver 1** in a fourth, non-transmission state.

Engagement grooves **130*b* that engage with the engagement protrusions 135*a* extending in the axial direction from the left sleeve 135 are formed in the inner peripheral surface of the disk 134 of the second drive force takeoff component 130. As a result of this engagement, the second drive force takeoff component 130 and the left sleeve 135 rotate integrally. The engagement protrusions 135*a* of this left sleeve 135 have striking surfaces 135*b* that strike the surfaces 125*e* extending in the radial direction of the engagement protrusions 125*d* of the middle sleeve 125, and as will be described below, these surfaces are biased in the striking direction by a second saver spring 127. The left sleeve 135 is provided with a pair of stop protrusions 135*c* that are stopped in depressions provided to the inside in the radial direction of the cam body 37 so that the left sleeve 135** will rotate integrally with the clutch.

When there is no operating force from the motor component 100, the pawl depressor **114*a* of the first control component 114 is disposed in a state in which it depresses the engagement pawl 122 of the first drive force takeoff component 120, and the pawl depressor 129*a* of the second control component 129 is disposed in a state in which it depresses the engagement pawl 132 of the second drive force takeoff component 130**.

A first elastic coupling mechanism in the form of a first saver spring 112, which is a torsion spring, is provided between the right sleeve 110 and the middle sleeve 125. One end **112*a* of the first saver spring 112 is engaged with a hole 110*d* formed in the engagement protrusion 110*b* of the right sleeve 110, and the other end 112*b* is engaged with a hole 125*c* provided to the engagement protrusion 125*a* of the middle sleeve 125. Similarly, a second elastic coupling mechanism in the form of a second saver spring 127, which is a torsion spring, is provided between the middle sleeve 125 and the left sleeve 135. One end 127*a* of the second saver spring 127 is engaged with a hole 125*f* formed in the engagement protrusion 125*d* of the middle sleeve 125, and the other end 127*b* is engaged with a hole 135*b* provided to the engagement protrusion 135*a* of the left sleeve 135**.

The first saver spring 112 and the second saver spring 127 are both assembled in a state in which initial spring force is applied. More specifically, the first saver spring 112 is assembled such that a biasing force in the direction in which the right sleeve 110 and the middle sleeve 125 strike will be at work in a state in which the right sleeve 110 and the middle sleeve 125 are striking the respective striking surfaces **110*c* and 125*c* thereof. Similarly, the second saver spring 127 is assembled such that a similar biasing force will be at work between the respective striking surfaces 125*e* and 135*b* of the middle sleeve 125 and the left sleeve 135. In this practical example, the initial spring force of the first saver spring 112 is roughly the same as the initial spring force of the second saver spring 127**, but the initial spring force of the two springs may instead be different.

With the present invention, when the operating force needed to operate the clutch is larger than a set value, the drive force takeoff components are displaced between a transmission state, in which the drive force from the driver 1 is transmitted to the clutch, and a non-transmission state, in which the drive force from the driver 1 is not transmitted to the clutch. This set value will be described using the first drive force takeoff component 120 and the first control component 114 as an example.

As described below, when the drive force from the driver 1 is to be used to aid the shifting operation in the upshifting direction, the motor component 100 must allow the first control component 114 to swing by the required operating angle until the engagement pawl 122 of the first drive force takeoff component 120 engages with the reverse motion unit 7. The operating force needed for this is the sum of adding the product of the spring coefficient and the operating angle of the first saver spring 112 to the initial spring force. This value shall be termed the "set value." The set value must be smaller than the operating force of the motor component 100, but otherwise can be selected as desired. For instance, this set value may be set extremely low, which allows the clutch to be operated by utilizing the drive force from the driver 1 via the drive force takeoff component at all times during shifting. With this practical example, however, the set value is set close to the operating force of the motor component 100.

The action of the drive force takeoff component will now be described. In this description, the operating force that is transmitted from the motor component 100 to the right sleeve 110 shall be called the motor operating force. Also, we shall assume that the bicycle B is in a drive state, and that a drive load is applied to the planet gear assembly. In this state, the operating force needed to operate the clutch, and thereby the left sleeve 135, shall be called the required operating force.

First, an upshift will be described. In this case, the right sleeve 110 is operated by the motor component 100 in the opposite direction from F. If, at this point, the required operating force is smaller than the set value, then the first saver spring 112 and the second saver spring 127 will cause the right sleeve 110, the middle sleeve 125, and the left sleeve 135 to rotate integrally, the clutch will be operated, and a shift will be made to the desired shift position. At this point, the first drive force takeoff component 120 is in the second, nontransmission state in which it is not engaged with the reverse motion unit 7.

If, however, the required operating force is larger than the set value, the right sleeve 110 rotates in the opposite direction from F, but the middle sleeve 125 cannot rotate because the lateral surface of the engagement protrusion strikes that of the left sleeve 135. Therefore, the right sleeve 110 rotates in the opposite direction from F with respect to the middle sleeve 125 against the biasing force from the first saver spring 112, which tries to cause the right sleeve 110 and the middle sleeve 125 to rotate integrally. When this happens, the pawl depressor **114*a* of the first control component 114, which up to now has been holding down the engagement pawl 122 of the first drive force takeoff component 120, rotates relatively, resulting in a first, transmission state that permits the engagement of the reverse motion unit 7 and the first drive force takeoff component 120. Accordingly, the drive force from the reverse motion unit 7 in the opposite direction from the driver 1 is transmitted to the clutch via the engagement pawl 122, the middle sleeve 125, and the left sleeve 135**, and a shift is made.

As the up-shift is made, the middle sleeve 125 and the left sleeve 135 strike each other at their engagement protrusions, and relative displacement does not occur, so the engagement pawl 133 of the second drive force takeoff component 130 is held down by the pawl depressor **129*a* of the second control component 129, and a fourth, non-transmission state in which the second ring gear 130 and the driver 1** are not engaged is maintained.

The action of the drive force takeoff components during a downshift will now be described.

Here, the right sleeve 110 is rotated in the direction of F when operated. If the required operating force is smaller than the set value of the saver spring 127, then the middle sleeve 125 and the right sleeve 110 will be striking each other at their striking protrusions, and so will rotate integrally, and since the left sleeve 135 is linked by the middle sleeve 125 and the second saver spring 127, it rotates integrally with the middle sleeve 125 as a result of the biasing force, and a shift is made.

However, if the required operating force exceeds the drive operating force, the left sleeve 135 will not move even if the middle sleeve 125 is rotated by the right sleeve 110, so the middle sleeve 125 rotates in the F direction relative to the left sleeve 135 against the biasing force of the second saver spring 127. When this happens, the pawl depressor **129*a* of the second control component 129 moves with respect to the engagement pawl 132 of the second drive force takeoff component 130, which allows for the engagement of the second drive force takeoff component 130 with the driver 1. Consequently, the drive force of the driver 1 in the F direction is transmitted to the clutch via the engagement pawl 132 and the left sleeve 135**, and a shift is made.

Thus, the operating force that has to be supplied by the bicycle rider can be minimized by utilizing the motor 101 to shift the internal transmission. Furthermore, if the drive force takeoff components are utilized, even if the operating force from the motor component 100 is small, a smooth shift can be made by utilizing the drive force from the driver 1. With a structure such as this, the motor 101 does not need to be as large, which means that the battery does not need to be as large, so a more compact system can be achieved. Also, the service life of the battery can be extended since not as much power is required.

While the above is a description of various embodiments of the present invention, further modifications may be employed without departing from the spirit and scope of the present invention. For example, the size, shape, location or orientation of the various components may be changed as desired. The functions of one element may be performed by two, and vice versa.

In the above embodiment, an internal bicycle transmission having seven shift positions was described, but the number of shift steps of this internal bicycle transmission may be other than seven. The present invention can also be applied to an internal bicycle transmission having a clutch portion that is rotationally displaced as the mechanism for selecting from among a plurality of drive routes.

In the above embodiment, the clutch was constructed so as to swing about the fixed shaft 3, but it may also be constructed so as to be displaced in the axial direction of the fixed shaft 3. In this case, the clutch can be designed to be operated by the provision of a cam face or the like that is angled with respect to the fixed shaft 3 to the clutch operation component.

In the above embodiment, the back-pedaling means was equipped with a reverse motion unit 7 and a pinion gear 6, and a drive force in the opposite direction from the rotational direction of the driver 1 was obtained by engagement of the first drive force takeoff component 120 with the reverse motion unit 7, but it is also possible to obtain a drive force in the opposite direction from the driver 1 by direct engagement of the first drive force takeoff component 120 on the fixed shaft 3 side of the pinion gear 6.

Figure 10:
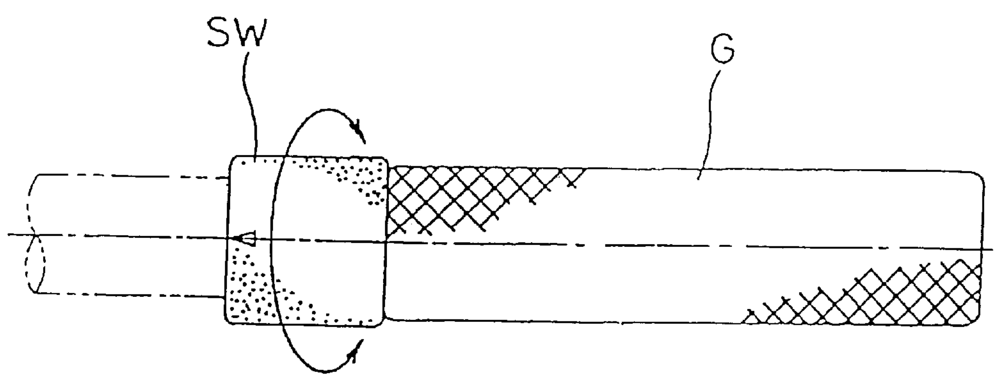
FIG. 10 is a plan view of an alternative embodiment of a switch used to operate the bicycle transmission shown in FIG. 2.

FIG. 10 illustrates another embodiment of the switch SW that selects the shift step. This switch is a grip lever provided such that it can swing about the grip G of the handlebar, has a home position that serves as a starting point, performs an up-shift by swinging in one direction from this home position, and performs a down-shift by swinging in the other direction. When the hand is moved away after each operation, the switch returns to its home position since it is biased in the direction of the home position by a spring.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A shift control apparatus for a bicycle transmission having a plurality of transmission paths comprising:

a hub shaft (3);

a driver (1) rotatably mounted around the hub shaft (3) for rotating in first and second directions, wherein the first direction is opposite the second direction;

a transmission path selecting member (135) for selecting among the plurality of transmission paths;

a reverse motion mechanism (5,6,7) coupled to the driver (1) for converting rotation of the driver (1) in the first direction into motion in the second direction; and an operation mechanism (110,112,114,120,125,127,129,130) for operating the transmission path selecting member (135), wherein the operation mechanism (110,112,114,120,125,127,129,130) includes a first drive force takeoff component (120) which moves between a first state and a second state, wherein the first drive force takeoff component (120) engages the reverse motion mechanism (5,6,7) when the first drive force takeoff component (120) is in the first state for communicating motion of the reverse motion mechanism (5,6,7) in the second direction to the transmission path selecting member (135), and wherein the first drive force takeoff component (120) is disengaged from the reverse motion mechanism (5,6,7) when the first drive force takeoff component (120) is in the second state.

2. The apparatus according to claim 1 wherein the operation mechanism (110,112,114,120,125,127,129,130) includes a first control component (114) coupled to the first drive force takeoff component (120) for switching the first drive force takeoff component (120) between the first state and the second state.

3. The apparatus according to claim 2 wherein the first drive force takeoff component (120) comprises:

a first engagement pawl (122) for engaging the reverse motion mechanism (5,6,7) when the first drive force takeoff component (120) is in the first state; and a first biasing mechanism (123) that biases the first engagement pawl (122) toward the reverse motion mechanism (5,6,7).

4. The apparatus according to claim 3 wherein the first control component (114) includes a first pawl depressor (114*a*) which allows the first engagement pawl (122) to engage the reverse motion mechanism (5,6,7) when the first control component (114) switches the first drive force takeoff component (120) into the first state and which prevents the first engagement pawl (122) from engaging the reverse motion mechanism (5,6,7) when the first control component (114) switches the first drive force takeoff component (120) into the second state.

5. The apparatus according to claim 1 wherein the reverse motion mechanism (5,6,7) comprises a reverse motion unit (7) that rotates around the hub shaft (3) in the second direction when the driver (1) rotates in the first direction.

6. The apparatus according to claim 5 wherein the reverse motion mechanism (5,6,7) further comprises:

a fixed member (5) fixed relative to the hub shaft (3); and a gear (6) rotatably mounted to the fixed member (5), wherein the gear (6) engages the driver (1) and the reverse motion unit (7).

7. The apparatus according to claim 1 wherein the operation mechanism (110,112,114,120,125,127,129,130) further comprises:

a transmission path control member (110);

a first elastic coupling mechanism (112) coupled in a path between the transmission path control member (110) and the transmission path selecting member (135) for exerting a first coupling force having a first set value between the transmission path control member (110) and the transmission path selecting member (135);

wherein the transmission path control member (110) moves relative to the transmission path selecting member (135) so that the first drive force takeoff component (120) assumes the first state when the transmission path control member (110) moves in the second direction and a required operating force of the transmission path selecting member (135) is above the first set value; and wherein the first drive force takeoff component (120) assumes the second state when the transmission path control member (110) moves in the second direction and the required operating force of the transmission path selecting member (135) is below the first set value.

8. The apparatus according to claim 7 wherein the first drive force takeoff component (120) further comprises:

a first engagement pawl (122) for engaging the reverse motion mechanism (5,6,7) when the first drive force takeoff component (120) is in the first state; and a first biasing mechanism (123) that biases the first engagement pawl (122) toward the reverse motion mechanism (5,6,7); and wherein the operation mechanism (110,112,114,120,125,127,129,130) further comprises:

a first control component (114) coupled to the first drive force takeoff component (120) for switching the first drive force takeoff component (120) between the first state and the second state;

wherein the first control component (114) includes a first pawl depressor (114*a*) which allows the first engagement pawl (122) to engage the reverse motion mechanism (6,7) when the first control component (114) switches the first drive force takeoff component (120) into the first state and which prevents the first engagement pawl (122) from engaging the reverse motion mechanism (6,7) when the first control component (114) switches the first drive force takeoff component (120) into the second state; and wherein the first elastic coupling mechanism (112) comprises a first spring coupled in a path between the transmission path control member (110) and the first control component (114).

9. The apparatus according to claim 7 further comprising a motor (101) for operating the transmission path control member (110).

10. The apparatus according to claim 9 further comprising a switch (SW) for operating the motor (101).

11. The apparatus according to claim 1 wherein the operation mechanism (110,112,114,120,125,127,129,130) further includes a second drive force takeoff component (130) which moves between a third state and a fourth state, wherein the second drive force takeoff component (130) engages the driver (1) when the second drive force takeoff component (130) is in the third state for communicating motion of the driver (130) in the first direction to the transmission path selecting member (135), and wherein the second drive force takeoff component (130) is disengaged from the driver (1) when the second drive force takeoff component (130) is in the fourth state.

12. The apparatus according to claim 11 wherein the operation mechanism (110,112,114,120,125,127,129,130) includes:

a first control component (114) coupled to the first drive force takeoff component (120) for switching the first drive force takeoff component (120) between the first state and the second state; and a second control component (129) coupled to the second drive force takeoff component (130) for switching the second drive force takeoff component (130) between the third state and the fourth state.

13. The apparatus according to claim 12 wherein the first drive force takeoff component (120) comprises:

a first engagement pawl (122) for engaging the reverse motion mechanism (5,6,7) when the first drive force takeoff component (120) is in the first state; and a first biasing mechanism (123) that biases the first engagement pawl (122) toward the reverse motion mechanism (5,6,7);

wherein the second drive force takeoff component (130) comprises:

a second engagement pawl (132) for engaging the driver (1) when the second drive force takeoff component (130) is in the third state; and a second biasing mechanism (133) that biases the second engagement pawl (132) toward the driver (1).

14. The apparatus according to claim 13 wherein the first control component (114) includes a first pawl depressor (114*a*) which allows the first engagement pawl (122) to engage the reverse motion mechanism (5,6,7) when the first control component (114) switches the first drive force takeoff component (120) into the first state and which prevents the first engagement pawl (122) from engaging the reverse motion mechanism (5,6,7) when the first control component (114) switches the first drive force takeoff component (120) into the second state, and wherein the second control component (129) includes a second pawl depressor (129*a*) which allows the second engagement pawl (132) to engage the driver (1) when the second control component (129) switches the second drive force takeoff component (130) into the third state and which prevents the second engagement pawl (132) from engaging the driver (1) when the second control component (129) switches the second drive force takeoff component (130) into the fourth state.

15. The apparatus according to claim 11 wherein the reverse motion mechanism (5,6,7) comprises a reverse motion unit (7) that rotates around the hub shaft (3) in the second direction when the driver (1) rotates in the first direction.

16. The apparatus according to claim 15 wherein the reverse motion mechanism (5,6,7) further comprises:

a fixed member (5) fixed relative to the hub shaft (3); and a gear (6) rotatably mounted to the fixed member (5), wherein the gear (6) engages the driver (1) and the reverse motion unit (7).

17. The apparatus according to claim 1 wherein the operation mechanism (110,112,114,120,125,127,129,130) further comprises:

a transmission path control member (110);

a first elastic coupling mechanism (112) coupled in a path between the transmission path control member (110) and the transmission path selecting member (135) for exerting a first coupling force having a first set value between the transmission path control member (110) and the transmission path selecting member (135);

wherein the transmission path control member (110) moves relative to the transmission path selecting member (135) so that the first drive force takeoff component (120) assumes the first state when the transmission path control member (110) moves in the second direction and a required operating force of the transmission path selecting member (135) is above the first set value;

wherein the first drive force takeoff component (120) assumes the second state when the transmission path control member (110) moves in the second direction and the required operating force of the transmission path selecting member (135) is below the first set value;

a second elastic coupling mechanism (127) coupled in a path between the transmission path control member (110) and the transmission path selecting member (135) for exerting a second coupling force having a second set value between the transmission path control member (110) and the transmission path selecting member (135);

wherein the transmission path control member (110) moves relative to the transmission path selecting member (135) so that the second drive force takeoff component (130) assumes the third state when the transmission path control member (110) moves in the first direction and the required operating force of the transmission path selecting member (135) is above the second set value; and wherein the second drive force takeoff component (130) assumes the fourth state when the transmission path control member (110) moves in the first direction and the required operating force of the transmission path selecting member (135) is below the second set value.

18. The apparatus according to claim 17 wherein the first drive force takeoff component (120) further comprises:

a first engagement pawl (122) for engaging the reverse motion mechanism (5,6,7) when the first drive force takeoff component (120) is in the first state; and a first biasing mechanism (123) that biases the first engagement pawl (122) toward the reverse motion mechanism (5,6,7);

wherein the second drive force takeoff component (130) further comprises:

a second engagement pawl (132) for engaging the driver (1) when the second drive force takeoff component (130) is in the third state; and a second biasing mechanism (133) that biases the engagement pawl (132) toward the driver (1);

wherein the operation mechanism (110,112,114,120,125,127,129,130) further comprises:

a first control component (114) coupled to the first drive force takeoff component (120) for switching the first drive force takeoff component (120) between the first state and the second state;

wherein the first control component (114) includes a first pawl depressor (114*a*) which allows the first engagement pawl (122) to engage the reverse motion mechanism (6,7) when the first control component (114) switches the first drive force takeoff component (120) into the first state and which prevents the first engagement pawl (122) from engaging the reverse motion mechanism (6,7) when the first control component (114) switches the first drive force takeoff component (120) into the second state;

wherein the first elastic coupling mechanism (112) comprises a first spring coupled in a path between the transmission path control member (110) and the first control component (114);

a second control component (129) coupled to the second drive force takeoff component (130) for switching the second drive force takeoff component (130) between the third state and the fourth state;

wherein the second control component (129) includes a second pawl depressor **(129*a*) which allows the second engagement pawl (132) to engage the driver (1) when the second control component (129) switches the second drive force takeoff component (130) into the third state and which prevents the second engagement pawl (132) from engaging the driver (1) when the second control component (129) switches the second drive force takeoff component (130) into the fourth state; and wherein the second elastic coupling mechanism (127) comprises a second spring coupled in a path between the transmission path control member (110) and the second control component (129)**.

19. The apparatus according to claim 17 further comprising a motor (101) for operating the transmission path control member (110).

20. The apparatus according to claim 19 further comprising a switch (SW) for operating the motor (101).

* * * * *